P. R. PARK.
BROODER.
APPLICATION FILED NOV. 6, 1909.
965,650.
Patented July 26, 1910.
3 SHEETS—SHEET 3.
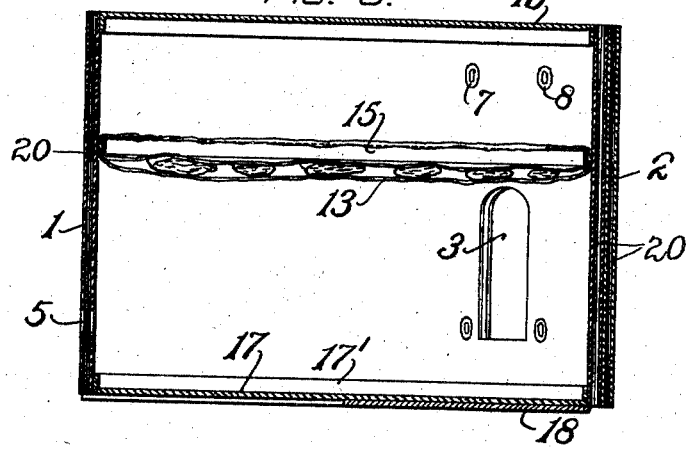
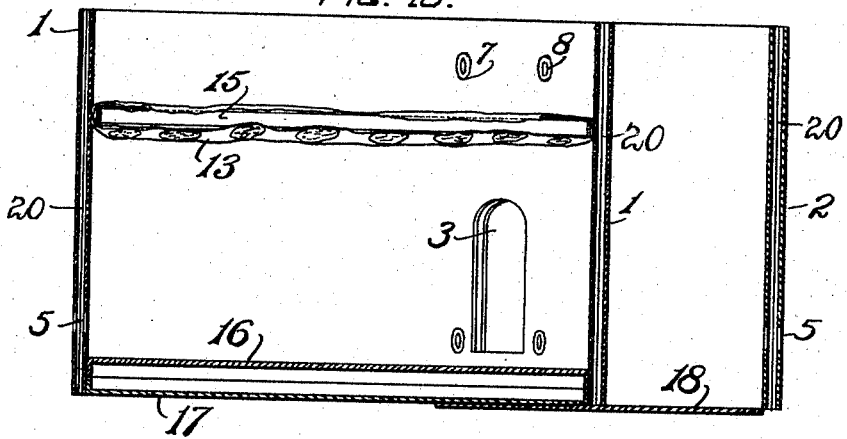
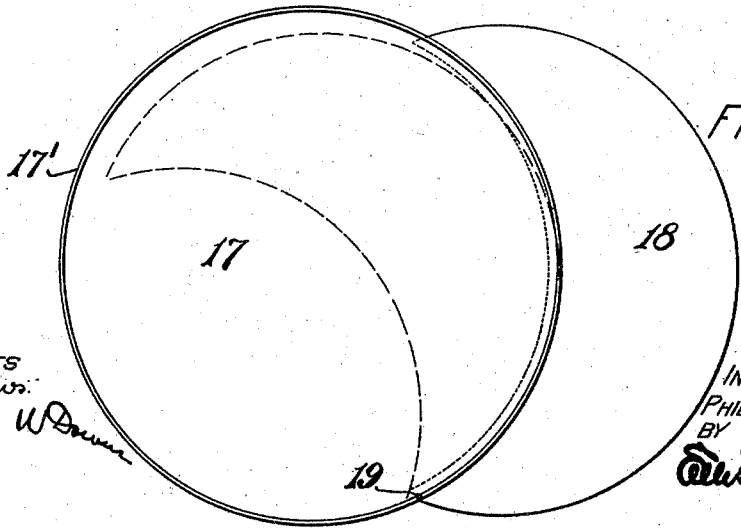
WITNESSES
INVENTOR
PHILIP R. PARK
BY
ATTY.

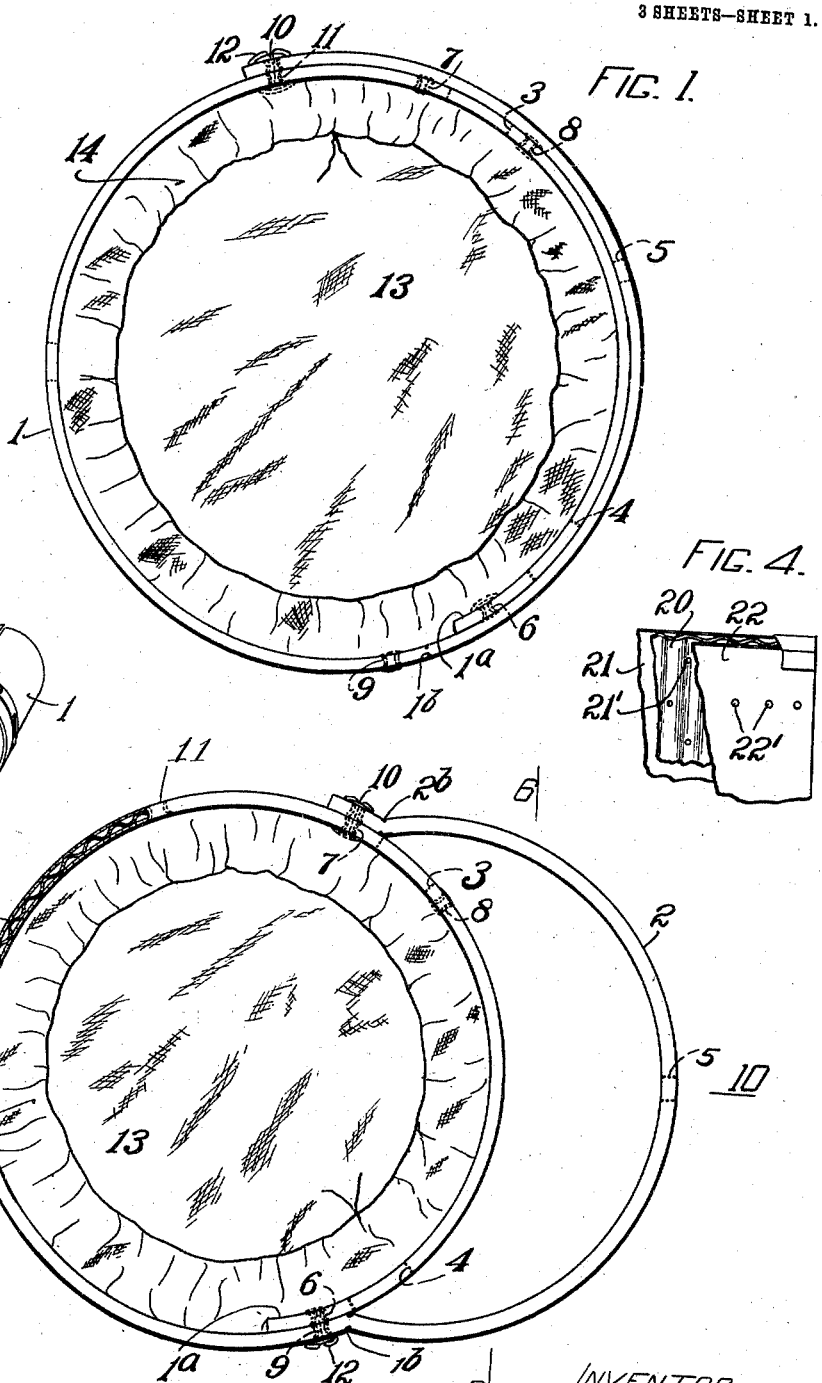
P. R. PARK.
BROODER.
APPLICATION FILED NOV. 6, 1909.
965,650.
Patented July 26, 1910.
3 SHEETS—SHEET 1.
INVENTOR
PHILIP R. PARK P. R. PARK.
BROODER.
APPLICATION FILED NOV. 6, 1909.
965,650.
Patented July 26, 1910.
3 SHEETS—SHEET 2.
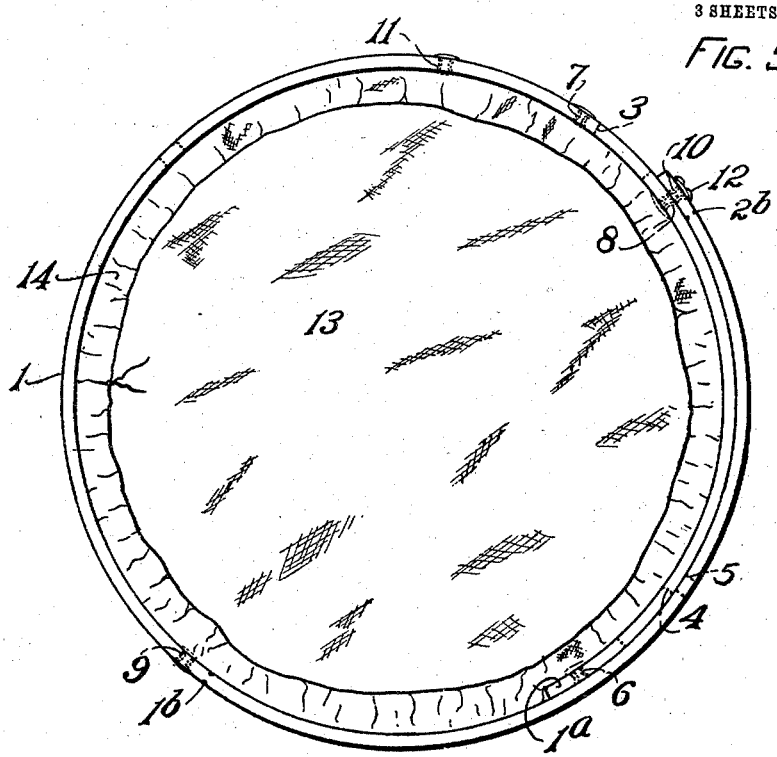
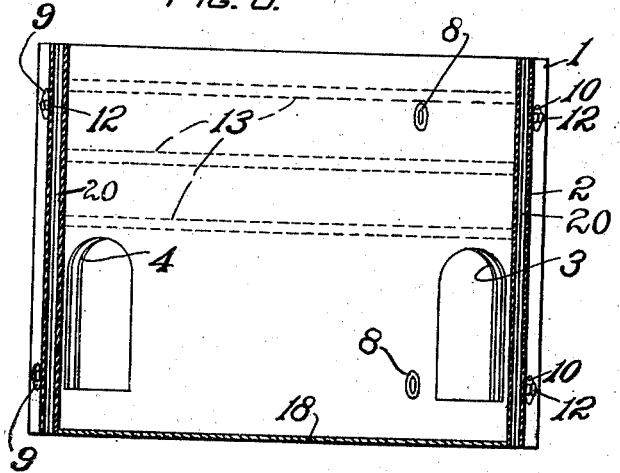
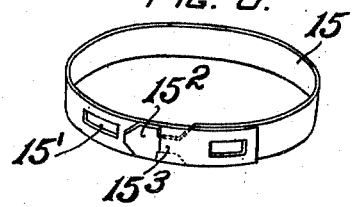
WITNESSES
INVENTOR
PHILIP R. PARK
BY
ATTY.
THE NORRIS PETERS CO., WASHINGTON, D. C.

UNITED STATES PATENT OFFICE.

PHILIP R. PARK, OF READING, MASSACHUSETTS, ASSIGNOR TO THE PARK & POLLARD COMPANY, OF BOSTON, MASSACHUSETTS, A CORPORATION OF MASSACHUSETTS.

BROODER.

965,650.  Specification of Letters Patent.  Patented July 26, 1910.

Application filed November 6, 1909. Serial No. 526,528.

*To all whom it may concern:*

Be it known that I, PHILIP R. PARK, a citizen of the United States, residing at Reading, county of Middlesex, Commonwealth of Massachusetts, have invented certain new and useful Improvements in Brooders, of which the following is a specification.

This invention relates to brooders and particularly to a flexible combination brooder and coop.

In the incubation and rearing of chickens, the care of the newly hatched young is a matter of great importance and of considerable difficulty. The temperature of the chicken is naturally high and there is great danger in exposing the young in view of this and in view of the sustained temperature of the incubator during the actual hatching. It is, therefore, necessary that the young chickens be kept warm and that their exposure to ordinary temperatures be accomplished gradually and without sudden change. The ordinary brooder built for this purpose of keeping the newly hatched young from sudden chill has usually been a bulky structure. As the brooder is only used for a comparatively short period during the rearing of the chickens, and as chickens are usually reared at only certain seasons of the year, it happens that there has been a necessary tendency to limit the brooding facilities in order to avoid the storage of a large bulk of brooding accommodations during the rest of the year. This has resulted in a crowding of the chickens or in a limitation of the period of brooding, both of which have resulted in a high rate of mortality and a very considerable loss on this account. It is, therefore, extremely desirable that there be a simple and inexpensive brooding means capable of snug stowage and available at a price which will permit a free use which will afford ample accommodation for all of the chickens successfully incubated.

The availability of brooders at a low price and the corresponding increase in number possibly permits the separation of the chickens at an early age into groups according to their development and strength. It is to be borne in mind that the chicken by nature seeks to maintain its warmth by crowding with others of its kind. This is a necessary instinct for the preservation of the chicken but it has resulted invariably in the destruction of the weaker, as the younger or less developed are trampled and smothered by the more robust. This has been particularly true in brooding constructions which have involved corners. The chickens naturally seek a corner and in the huddling in the angle of the wall the greatest danger exists. To the end, therefore, of producing a brooder which shall be capable of compact stowage, warm, adjustable to meet the growth of the chickens, adapted to advance the chicken by gradual degrees from incubation to atmospheric temperature and which shall be available at a price which shall permit ample usage, I have devised my present invention.

By my invention I have produced a brooder having flexible walls which permit it to be rolled in a compact space and a covering which shall be capable of adjustment to varying degrees of temperature and which embodies various other features of structure for an arrangement which will permit it to be adapted to the various stages of brooding.

In the specification which follows the invention is more fully set forth and in it I have described, as illustrative of the principles of my invention, a brooder construction well adapted to the purposes specified.

Throughout the specification and also in the drawing which forms a part thereof I have employed reference numerals correspondingly used and applied to indicate like parts and in the drawings I have shown the illustrative embodiment above referred to in a series of figures which are as follows:—

Figure 1 is a view of my brooder in its first adaptation shown in plan (with cover removed) for the reception of newly hatched chickens, Fig. 2 is a similar plan view with yard extended, Fig. 3 is a view of the brooder rolled for storage or shipment, Fig. 4 is a detail of the wall construction, Fig. 5 is a plan view of the brooder enlarged to uncover one door, Fig. 6 is a vertical section on the line 6—6, Fig. 2, Fig. 7 is a perspective fragment of the brooder quilt, Fig. 8 is a view of the quilt ring, Fig. 9 is a vertical sectional view of Fig. 1 with covers applied for use as a chicken shipping crate, Fig. 10 is a vertical sectional view on the line 10—10, Fig. 2, showing the covers applied as a flooring, and Fig. 11 is a plan view of the lower cover.

1 is a coop forming wall section having a free end 1ª and a jointed portion at the opposite end 1ᵇ at which portion a yard forming and door closing section 2 is joined by a flexible hinge.

3 and 4 are door openings in the section 1, and 5 is a feeding opening on the section 2.

The section 1 is provided with pairs of eyelets vertically arranged at 6, 7, 8, 9 and 11 and the outer end of the section 2 is provided with similar eyelets at 10. A short portion of the end of the section 2 is hinged at 2ᵇ.

Two pairs of pronged fasteners 12 are provided for fastening together the ends of the sections 1 and 2 in the different positionings of the brooder walls. In the first position shown in Fig. 1 the sections are united by inserting a pair of fasteners 12 through the eyelets 11. The end of the section 2 will then be lapped about section 1 covering the openings 3 and 4 and fastened thereto by inserting the ends of the fasteners which have been put through the eyelets 11, through the eyelets 10 which are formed at the end of section 2. This gives a coop entirely closed about and of a circular form with no corners or angles between the walls of which the chickens may crowd. When in this position the brooding quilt 13 is suspended by its marginal portion 14 within the brooder by means of the expansible spring hoop 15. As indicated at Fig. 6, it will be first lowered into substantial contact with the chickens so as to lightly rest upon them and keep them snug and warm. From time to time as the chickens mature the brooding quilt or pad 13 is raised, as indicated in dotted lines, until it is at the top of the walls of the coop. The hoop 15 has a series of slots 15¹ and an arrow head 15² with an elongated neck 15³ which permits a certain amount of play so that the hoop may expand or contract in adapting itself to its holding position.

The chickens are usually kept in the closed form of the brooder shown in Fig. 1 for the first twenty-four hours after leaving the incubator. As the chickens develop and it becomes advisable to give them more room the fasteners 12 are removed from the eyelets 11 to the eyelets 7 and are passed through the eyelets 10, thus securing the end of the section 2 in an advanced position (see Fig. 2). In this position, as shown in Figs. 2 and 10, the wall 2 now forms a segmental or crescent shaped yard in front of the openings 3 and 4 of the coop but terminating just outside of them. On account of the flexible hinged portions 1ᵇ and 2ᵇ, the wall 2 by its yielding nature forms itself in the arc of an intersecting circle which cuts the circularly disposed wall of the coop portion just outside of the edges of the doors 3 and 4. This relieves the angles between the walls 1 and 2 of their feature of danger as crowding merely thrusts the chicken first in the corner through the adjacent opening 3 or 4. In this manner not only is the danger of trampling and smothering avoided but a circulation of the individual chickens is secured which gives the necessary opportunity for exercise and the development of each member irrespective of his comparative strength. 5 is an opening outside of which a receptacle for food or water may be placed, and through which the chicken may reach to secure food or water without being able to get into the dish. The brooder is usually kept in this form for about two days.

16 and 17 are top and bottom covers for the brooder. The cover 16 is an ordinary circular flanged cover while 17 is an expansible cover comprising a main circular body portion with a fixed flange 17¹ on its margin.

18 is a crescent shaped extension (see Fig. 11) hinged at 19 to the cover 17 so that the crescent portion 18 may be swung out as indicated in dotted lines in Fig. 11. In Fig. 10 the extension 18 is shown swung out to form the flooring of the yard formed by the wall 2. In this section is also shown how the top 16 is set on the bottom 17 to give a double flooring with an insulating air space between.

When it is desired to ship a brood of young chickens elsewhere for raising the brooder is contracted to its position shown in Figs. 1 and 9. The cover 16 is set on the top and the cover 17 with its crescent extension 18 is swung in and set on the bottom. The brooder in this position, and with the quilt properly adjusted may be safely shipped with the hood contained within it. After the third day, if the chickens have been properly advanced as is provided for by my brooder, they may be safely permitted more room than the yard 2 affords and the brooder is then readjusted by fastening the free end of the yard section 2 between the doors 3 and 4. To do this the eyelets 10 and 8 are brought into registry and the fasteners 12 inserted through 10 and 8 and 6 and 9 and this leaves the door 3 open and converts the brooder into a more advanced state in which it is practically a brooding coop.

The walls 1 and 2 are constructed with narrow vertically disposed air cells which afford a complete insulation and at the same time permit the necessary give and play of the wall elements in rolling. They may be constructed by the application of wall covering within and without to a vertically ribbed sheet.

In Fig. 4 I have shown a suitable construction in which a sheet 20 of vertically ribbed thin metal or other suitable material will afford sufficient longitudinal flexibility and vertical strength or inflexibility to protect the chickens. Within this is attached another wall 21 which is preferably formed of some soft fibrous material such as a felting which is caught to the inner lining 20 on the points $20^1$.

22 is an outer surfacing preferably externally glazed or coated so as to be impervious to moisture. This is caught, as indicated at $22^1$ to alternating ribs so that the surfaces 21 and 22 are attached to alternate ribs of the sheet 20. This structure permits a free play of the parts when the device is rolled.

When not in use or when prepared for storage or shipment, the device is rolled into a compact bundle, as shown in Fig. 3, and the covering 13 and fasteners 12 are thrust within the roll. This makes it possible to store, pack or ship the device with great ease and with little expense and at the same time the brooder may be set up and adjusted at a moment's notice.

Various modifications in the construction, form and materials of the device may obviously be made, all without departing from the spirit of my invention if within the limits of the appended claims.

What I therefore claim and desire to secure by Letters Patent is:—

1. In a combination brooder, a longitudinally flexible but vertically inflexible wall comprising a section for forming a circular brooder coop having entry openings therein and a section adapted to overlap said openings to close the same or to be formed about said openings as a yard.

2. A device of the class described comprising a circular coop, a movable segmental yard wall connected with said coop, said coop having entry openings within the points of connection of the yard wall therewith and means to hold said yard wall against said openings to close them.

3. In a device of the class described a frame comprising a member flexible longitudinally but inflexible vertically and an inner and an outer wall associated with said frame to secure an insulating dead air space between the same.

4. In a device of the class described a frame comprising a vertically corrugated member flexible longitudinally but inflexible vertically and an inner and an outer wall associated with said frame to secure an insulating dead air space between the same.

5. In a device of the class described a wall longitudinally flexible but vertically inflexible and comprising a circular coop forming section having door openings therein and a segmental yard forming or door closing section, means for attaching one end of the coop section intermediate of the coop and yard sections and means to attach the free end of the yard section to the coop section beyond the door opening.

6. In a device of the class described a circular coop, a canopy comprising a circular brooding pad and a surrounding portion of thinner material and means engaging said portion to support said brooding pad a proper distance within said coop.

7. In a device of the class described a flexible wall comprising a flexible coop forming portion having ends adapted to be overlapped, means for joining the overlapped ends of said portion, a second flexible portion loosely hinged to one end of said coop portion and having a loosely hinged flap on its end and means for fastening said flap at one point to said coop section to form a yard wall and to a second point to bring it closely against said coop wall.

8. A combination brooder and shipper comprising a circular coop having a doorway in its wall, a section hinged thereto to form a segmental yard wall or to close said doorway, means for holding said section in either position and a circular cover having a crescent extension hinged thereto to be swung within the margin of said cover when used in shipping or to be swung out to form a flooring for said yard.

9. A combined brooder and shipper comprising a circular coop open at both top and bottom and a pair of flanged disks adapted to be used as covers in shipping or to form a double flooring with an air space between in brooding.

In testimony whereof, I affix my signature in presence of two witnesses.

PHILIP R. PARK.

Witnesses:
  E. LOUISE HUNTER,
  RUTH L. BENNETT.